R. J. FRY.
STUMP JUMP CULTIVATING IMPLEMENT.
APPLICATION FILED JULY 27, 1914.
1,194,006.
Patented Aug. 8, 1916.
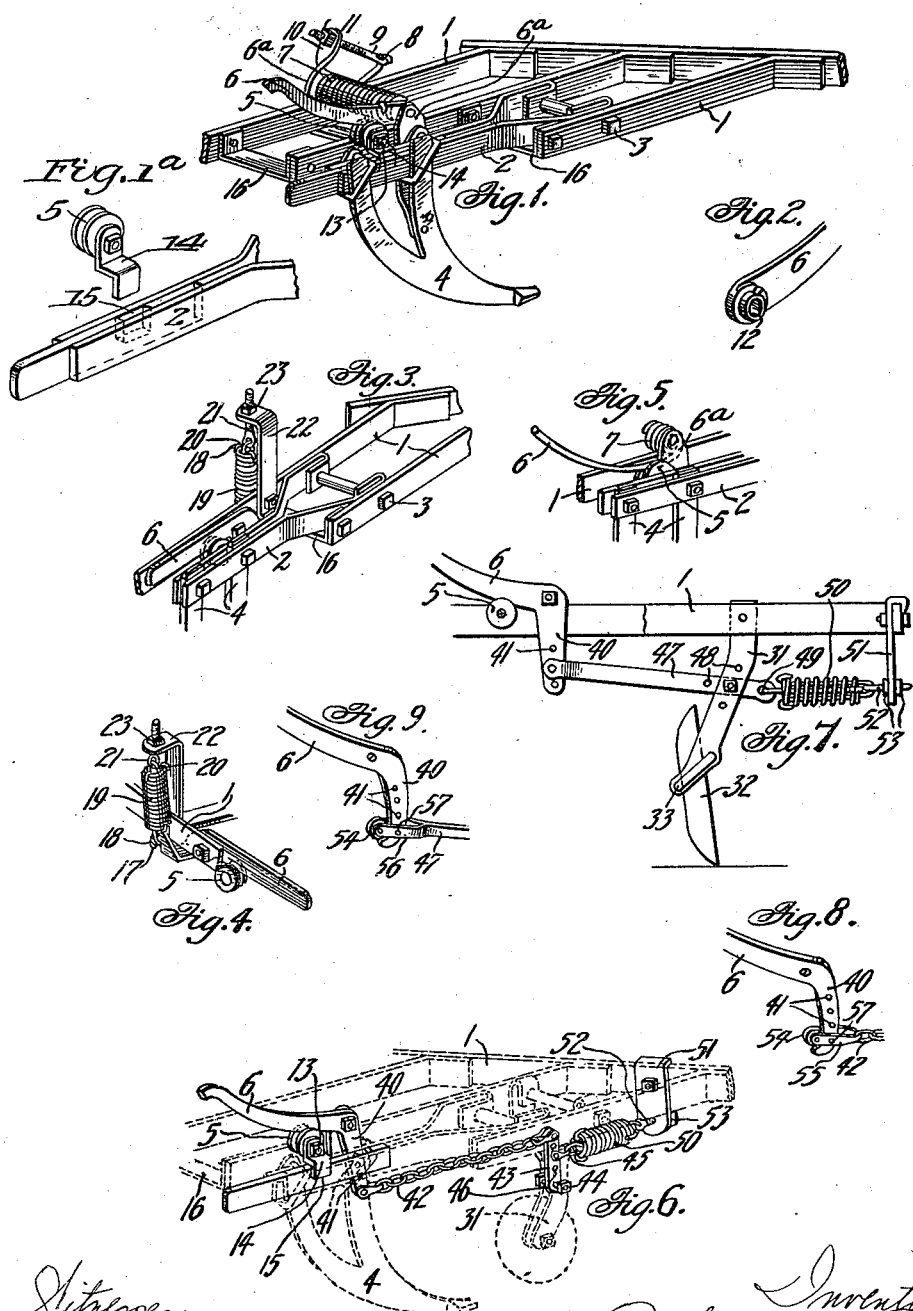

UNITED STATES PATENT OFFICE.

RICHARD JOHN FRY, OF NORTH MELBOURNE, VICTORIA, AUSTRALIA.

STUMP-JUMP CULTIVATING IMPLEMENT.

1,194,006.  Specification of Letters Patent.  Patented Aug. 8, 1916.

Application filed July 27, 1914. Serial No. 853,367.

*To all whom it may concern:*

Be it known that I, RICHARD JOHN FRY, of 27 Curran street, North Melbourne, in the State of Victoria, Commonwealth of Australia, manufacturer, have invented certain new and useful Improvements in Stump-Jump Cultivating Implements, of which the following is a specification.

This invention relates to improvements in stump-jump mechanism for cultivating implements and has been devised for the purpose of providing means whereby an increasing and then a diminishing downward pressure will be exerted on the tilling members as they rise after coming into contact with an obstacle when working in the ground.

An important feature of the present invention is the provision of means, exceedingly simple and easily controlled, for governing the pressure so that it will not increase after the tilling member has entered the soil and will permit of it decreasing when the tilling member has been raised to or approximately to the surface of the ground. The improvements, furthermore, insure the tilling members being returned quickly to their normal working positions when an obstacle is passed. Moreover, in the present invention the greatest pressure is exerted by the spring at that point in the return movement of the tilling member where it is entering the land after having risen over an obstruction.

The improvements hereinafter described can be adapted readily to various types of stump-jump cultivating implements and will be capable of adjustment to suit different kinds of land to be tilled.

With the above and other objects in view the invention consists of the features of construction, combination and arrangement hereinafter fully described with reference to the accompanying explanatory drawings, wherein:—

Figure 1 is a view in perspective of part of a plow frame fitted with the improvements comprised in the present invention. Fig. 2 is a view in perspective of a detail in the construction of Fig. 1. Figs. 3 and 4 are views in perspective showing a modification of the invention. Fig. 5 is a view in perspective of a slight modification of the construction shown in Fig. 1. Fig. 6 is a view in perspective of a further modification of the invention and shows the novel features in solid lines and the ordinary construction in broken lines. Fig. 7 is a view in side elevation of a still further modification of the invention. Figs. 8 and 9 are views of constructional details hereinafter described.

In these drawings the numeral 1 designates part of a plow frame which can be of any ordinary design and not necessarily of the type shown. A stump-jump beam 2 is pivoted at its forward end on a bolt 3 mounted in the frame while the rear end of the beam is arranged to carry a stem 4 for supporting a tilling member, not shown. A roller 5 is mounted on one side of the rear end of the beam 2 and preferably is grooved to accommodate the bearing and lower edge of a lever 6 pivoted on a spindle supported by lugs 6$^a$ fitted to the frame 1 between the pivot point of the beam 2 and the said roller. If preferred the lever 6 can be arranged to bear on a stud or projection fitted to or formed on the beam and not necessarily on the roller 5. The lever 6 is pressed downwardly on the roller 5 by means of a coil spring 7 mounted on the frame 1 at right angles to the beam. The lever 6 can be arranged and constructed as shown in Fig. 1 or it can be formed by extending one end of the spring as shown in Fig. 5 of the drawings.

The spring 7 is placed horizontally or approximately horizontally on the frame 1 and one of its ends is arranged to bear upon the top of the lever 6 while its opposite end is formed into a hook 8 to engage an eye made on one end of a screwed rod 9 which is adjustably mounted in a bracket 10 fitted to the implement frame. By adjusting the position of a nut 11 on the said screwed rod 9 the torsional strain on the spring can be increased or decreased, as required. The pivot end of the lever 6 is formed with an inwardly projecting boss 12 which fits neatly in the end of the spring 7. The said boss 12 is shaped as shown in Fig. 2 to conform to the outline of the end of the spring. The roller 5 is mounted on a spindle 13 supported by a bracket 14 which is detachably fitted in a mortise or recess 15 in the top of the beam 2. The said bracket 14 may be formed with any other form of detachable engagement with the said beam 2 and not necessarily by mortising the latter.

The beam, lever and roller are so arranged that when the tilling member is raised by coming into contact with an object fixed in the ground the roller moves along the underside of the lever and away from the pivot point thereof. As the beam rises it forces the lever 6 upwardly and in the first part of the movement the lever bears downwardly and the pressure is increased on the roller. When the lever is moved upwardly to a point at which it bears more or less on the front of the roller 5 the downward pressure on the beam is decreased and such downward pressure lessens as the beam and lever are mover farther upwardly. By curving the lever upwardly as shown in the drawings it offers less resistance to the movement of the roller and thereby enables the beam to be raised easier than when a straight lever is used. While an upward curve of the lever will insure a gradual diminution of the downward pressure on the beam as the latter rises the opposite effect will take place if the lever is curved downwardly. The lever 6 is arranged so that it will be bearing more or less downwardly on the roller 5 until the tilling member is clear of the ground and more or less on the front of the roller in its further upward movement. This construction insures an increasing or uniform and then a diminishing pressure to be exerted on the beam carrying the tilling member. The beam when in its normal working position rests upon a cross stay 16 fitted to the frame of the plow. In lieu of forming the lever 6 separately from the spring 7 it can be formed integrally therewith by extending one end of the spring as shown in Fig. 5 of the drawings.

The above-mentioned constructions permit of a spring with a very little movement being used and as the pressure is applied in a direct manner the spring is not exerted to any appreciable extent when the implement is in normal work. It is preferable to employ a coil spring tested to a complete circle of movement and in practice to take approximately one-eighth of a circle to obtain working pressure and a further one-fourth of a circle to cover all possible jumping action. If the spring is constructed and arranged as set out it will be obvious that a reliable working article of an assured life will be obtained with the further advantage that no matter how far the rising beam is raised the spring will still exert a returning pressure toward the work.

In the modification shown in Figs. 3 and 4 of the drawings the lever 6 is pivoted to the frame 1 and has an extension on its forward end which is formed into a hook 17 to engage the looped portion of a bent rod 18 having its ends folded or bent over the upper end of a compression spring 19. The compression spring 19 is arranged vertically or approximately vertically and passing downwardly therethrough is a looped rod 20 similar to that engaged by the hooked end of the lever 6. The second-mentioned looped rod 20 is supported by an eyebolt 21 which passes through a bracket or standard 22 fitted to the frame. The rear end of the lever 6 can be straight or curved as preferred and the strength of the spring 19 can be adjusted by screwing up or unscrewing a nut 23 on the eyebolt 21.

In the construction shown in Figs. 6 and 7 of the drawings the spring for operating the lever 6 is dispensed with and in lieu thereof the downward pressure is exerted by connecting the draft mechanism to an arm 40 depending from the pivot point of the lever. In that form of the invention shown in Fig. 6 the depending arm 40 of the lever 6 is furnished with a series of holes 41 to permit a chain 42 or other flexible member being adjustably connected thereto. The opposite or forward end of the said flexible member is connected to the upper end of a short lever 43 having its lower end pivotally mounted on a pin or bolt 44 passing through the colter carrying lever 31. A draft chain 45 is connected to the short lever 43 at any point between the pivot point thereof and the part to which the flexible member is secured. The short lever 43 is provided with a series of holes 46 to permit of the flexible member and the draft chain 45 to be adjusted to suit different conditions of work. In lieu of connecting the depending arm 40 of the lever 6 to the short lever 43 affixed to the colter carrying lever 31 it can be connected by a link or bar 47 to the said colter carrying lever as shown in Fig. 7 of the drawings. The colter carrying lever 31 and link or bar 47 can be furnished with a series of holes 48 to permit of the parts to be adjusted to suit different conditions of work. The forward part of the link 47 can be formed with a hole 49 or other means to permit of the attachment of draft chain or the like. The colter carrying lever 31 can be made to take either a disk or knife colter as preferred and the beam 2 likewise can be furnished with a disk or share and moldboard for tilling the soil.

In an alternate construction the central part of the short lever 43 is connected by a resilient connection comprising a spring 50 and a chain or the like to a bracket 51 on or to the front part of the frame. The short lever 43 is provided with a series of holes 46 in the short lever 43 to permit of a desired adjustment of the chain 42 and resilient connection to suit existing conditions or work. The compression of the spring 50 in the resilient connection can be adjusted by means of a screwed eyebolt 52 and nuts 53 to obtain a greater or lesser pressure on the beam.

A resilient connection similar to that above-described can be made between the forward end of the link or bar 47 and a bracket or the like fitted to the forward part of the plow frame.

In lieu of fixedly connecting the rear end of the chain 42 and link 47 to the depending arm 40 of the lever 6 they can be movably connected thereto as shown in Figs. 8 and 9 of the drawings, respectively. In these views the rear face of the depending arm 40 is slightly curved and has a returned end to limit the downward travel of a roller 54 fitted to the end of the chain 42 or link 47. The said roller can be carried by a shackle 55 fitted to the end of the said chain or by a jaw 56 formed on the end of the said link. The curvature of the rear face of the depending arm must be such as to permit of the roller 54 moving gradually upwardly as the lever 6 is forced upwardly by the beam rising and to permit of it returning in a like manner when the lever is descending to its normal position. If preferred, the sides of the shackle 55 and jaw 56 can be furnished with holes 57 to permit of a pin being inserted therethrough and through the depending arm 40 to hold the said shackle and jaw in a fixed relationship to the lever 6.

What I claim is:—

1. A stump jump mechanism for plows and like cultivating implements comprising a beam pivoted at its forward end, an implement frame to which said beam is pivoted, a tilling member fitted to said beam at its free end, a roller mounted near the free end of said beam, a curved lever having its forward end pivotally mounted between the pivot points of the said beam and said roller on said beam, the pivot of said curved lever being horizontal, a coiled torsional spring fitting around said spindle and having one end arranged to bear downwardly on the curved lever, and a pressure adjusting device on the opposite end of said torsional spring.

2. A stump jump mechanism for plows and like cultivating implements comprising in combination, a beam pivoted at its forward end, an implement frame to which said beam is pivoted, a tilling member fitted to said beam at its free end, a roller mounted near the free end of said beam, vertical lugs on said implement frame, a spindle supported horizontally in said lugs, a curved lever having its forward end pivotally mounted on said horizontal spindle, a coiled torsional spring fitting around said spindle and having one end bearing on the top of the curved lever and the opposite end formed into a hook, a screw rod having an eye at one end engaging the hook on the spring and its opposite end passing through a bracket on the implement frame, and a nut on the screwed end of the rod bearing against the said bracket.

3. A stump jump mechanism for plows and like cultivating implements comprising in combination a beam pivoted at its forward end, an implement frame to which said beam is pivoted, a tilling member fitted to said beam, at its free end, a roller mounted near the free end of said beam, vertical lugs on the implement frame between the pivot point of the beam and the roller thereon, a spindle supported horizontally by said lugs, a coiled torsional spring fitting around said spindle and having one end projecting rearwardly and bearing on the roller, and adjusting means connected to the opposite end of said spring and fixedly connected to the implement frame.

4. A stump jump mechanism for plows and like cultivating implements comprising in combination, a beam pivoted at its forward end, an implement frame to which said beam is pivoted, a tilling member pivoted to said beam at its free end, a roller mounted near the free end of said beam, a lever pivotally mounted on the implement frame between the pivot point of the beam and the roller mounted thereon, a forward extension on said lever, and a resilient member connected to said forward extension and pivotally connected to said implement frame, said resilient member being arranged to force the lever down on the roller.

In testimony whereof I affix my signature in presence of two witnesses.

RICHARD JOHN FRY.

Witnesses:
JAMES H. ANDERSON,
G. McNAMARA.

Copies of this patent may be obtained for five cents each, by addressing the "Commissioner of Patents, Washington, D. C."